United States Patent

Kamal

(10) Patent No.: US 12,549,537 B2
(45) Date of Patent: *Feb. 10, 2026

(54) SYSTEMS AND METHODS FOR PROVIDING DIGITAL IDENTITY RECORDS TO VERIFY IDENTITIES OF USERS

(71) Applicant: MASTERCARD INTERNATIONAL INCORPORATED, Purchase, NY (US)

(72) Inventor: Ashfaq Kamal, Stamford, CT (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 508 days.

This patent is subject to a terminal disclaimer.

(21) Appl. No.: 18/071,502

(22) Filed: Nov. 29, 2022

(65) Prior Publication Data

US 2023/0086806 A1    Mar. 23, 2023

Related U.S. Application Data

(63) Continuation of application No. 16/679,115, filed on Nov. 8, 2019, now Pat. No. 11,522,848, which is a
(Continued)

(51) Int. Cl.
*H04L 29/06*    (2006.01)
*G06F 21/33*    (2013.01)
(Continued)

(52) U.S. Cl.
CPC .......... *H04L 63/0823* (2013.01); *G06F 21/33* (2013.01); *G06F 21/35* (2013.01);
(Continued)

(58) Field of Classification Search
CPC ..... H04L 63/0823; H04L 63/06; G06F 21/33; G06F 21/35; G06F 21/64; G06Q 10/10;
(Continued)

(56) References Cited

U.S. PATENT DOCUMENTS 7,680,819 B1    3/2010    Mellmer et al.
9,124,433 B2    9/2015    Marien et al.
(Continued)

FOREIGN PATENT DOCUMENTS

CA    2886548 A1    9/2015
EP    3073670 A1    9/2016
(Continued)

OTHER PUBLICATIONS

U.S. Appl. No. 15/476,526, filed Mar. 31, 2017.
(Continued)

*Primary Examiner* — Noura Zoubair
(74) *Attorney, Agent, or Firm* — Harness, Dickey & Pierce, P.L.C.

(57) ABSTRACT

Systems and methods are provided for verifying identities of users. One example computer-implemented method includes requesting a unique ID for a user, from a software development kit (SDK) in a mobile device, and issuing the unique ID for the user. The method also includes generating, by the SDK, a public/private key pair specific to the unique ID, prompting the user to capture an image of a government issued document, and capturing the image of the document. The method further includes validating, by the mobile device, the identity of the user based on the image of the document and, based on the validation, (i) converting the image via a one-way hash function, (ii) signing the hashed image with the private key of the public/private key pair, and (iii) transmitting the signed hashed image, the unique ID, and the public key of the public/private key pair to an identification provider.

19 Claims, 6 Drawing Sheets

Related U.S. Application Data continuation of application No. 15/476,526, filed on Mar. 31, 2017, now Pat. No. 10,476,862.

(51) Int. Cl.

| | | |
|---|---|---|
| *G06F 21/35* | (2013.01) | |
| *G06F 21/64* | (2013.01) | |
| *G06Q 10/10* | (2023.01) | |
| *G06Q 20/02* | (2012.01) | |
| *G06Q 20/38* | (2012.01) | |
| *G06Q 20/40* | (2012.01) | |
| *G06Q 40/02* | (2023.01) | |
| *G06Q 50/26* | (2012.01) | |
| *H04L 9/32* | (2006.01) | |
| *H04L 9/40* | (2022.01) | |

(52) U.S. Cl.
CPC ............ *G06F 21/64* (2013.01); *G06Q 10/10* (2013.01); *G06Q 20/02* (2013.01); *G06Q 20/38215* (2013.01); *G06Q 20/4014* (2013.01); *G06Q 40/02* (2013.01); *G06Q 50/265* (2013.01); *H04L 9/3247* (2013.01); *H04L 63/06* (2013.01); *G06Q 2220/00* (2013.01)

(58) Field of Classification Search
CPC ............ G06Q 20/02; G06Q 20/38215; G06Q 20/4014; G06Q 40/02; G06Q 50/265
See application file for complete search history.

(56) References Cited

U.S. PATENT DOCUMENTS

| | | |
|---|---|---|
| 9,137,228 B1 | 9/2015 | Newstadt |
| 9,519,901 B1 | 12/2016 | Dorogusker |
| 9,635,000 B1 | 4/2017 | Muftic |
| 9,992,022 B1 | 6/2018 | Chapman et al. |
| 10,454,677 B1 | 10/2019 | Nagelberg et al. |
| 10,476,862 B2 | 11/2019 | Kamal |
| 11,528,139 B2 | 12/2022 | Smets et al. |
| 11,663,595 B1 | 5/2023 | Houseworth et al. |
| 2002/0100803 A1 | 8/2002 | Sehr |
| 2003/0163708 A1 | 8/2003 | Tang |
| 2006/0000892 A1 | 1/2006 | Bonelle et al. |
| 2006/0157559 A1 | 7/2006 | Levy et al. |
| 2006/0229979 A1 | 10/2006 | Sato et al. |
| 2007/0208869 A1 | 9/2007 | Adelman et al. |
| 2007/0214093 A1 | 9/2007 | Colella |
| 2007/0250704 A1 | 10/2007 | Hallam-Baker |
| 2008/0256594 A1 | 10/2008 | Satish et al. |
| 2009/0164526 A1 | 6/2009 | Hayashi |
| 2009/0327144 A1 | 12/2009 | Hatter et al. |
| 2010/0067691 A1 | 3/2010 | Lin et al. |
| 2011/0191829 A1 | 8/2011 | Fischer et al. |
| 2011/0289318 A1 | 11/2011 | Zhang et al. |
| 2013/0226813 A1 | 8/2013 | Voltz |
| 2014/0068722 A1 | 3/2014 | Hayat |
| 2014/0101453 A1 | 4/2014 | Senthurpandi |
| 2014/0189808 A1 | 7/2014 | Mahaffey et al. |
| 2014/0279516 A1 | 9/2014 | Rellas et al. |
| 2014/0279519 A1 | 9/2014 | Mattes et al. |
| 2014/0282884 A1 | 9/2014 | Bao et al. |
| 2015/0038118 A1 | 2/2015 | Berteau et al. |
| 2015/0059003 A1 | 2/2015 | Bouse |
| 2015/0095999 A1 | 4/2015 | Toth |
| 2015/0295906 A1 | 10/2015 | Ufford et al. |
| 2015/0319170 A1 | 11/2015 | Grossemy |
| 2015/0356523 A1 | 12/2015 | Madden |
| 2016/0210621 A1 | 7/2016 | Khan |
| 2016/0239653 A1* | 8/2016 | Loughlin-Mchugh ..................... G06F 21/35 |
| 2016/0300236 A1 | 10/2016 | Wiley et al. |
| 2016/0328713 A1* | 11/2016 | Ebrahimi ................ G06F 21/31 |
| 2016/0330027 A1 | 11/2016 | Ebrahimi |
| 2016/0330035 A1 | 11/2016 | Ebrahimi et al. |
| 2016/0364703 A1 | 12/2016 | Bhatt et al. |
| 2016/0364730 A1 | 12/2016 | Rans et al. |
| 2017/0022814 A1 | 1/2017 | Ervin |
| 2017/0111175 A1 | 4/2017 | Oberhauser et al. |
| 2017/0201498 A1 | 7/2017 | Baig et al. |
| 2017/0213211 A1 | 7/2017 | Sibert et al. |
| 2017/0222814 A1 | 8/2017 | Oberhauser et al. |
| 2017/0250972 A1 | 8/2017 | Ronda et al. |
| 2017/0257358 A1 | 9/2017 | Ebrahimi et al. |
| 2017/0316409 A1 | 11/2017 | Smith et al. |
| 2018/0048864 A1 | 2/2018 | Taylor et al. |
| 2018/0068173 A1* | 3/2018 | Kolleri .................. G06Q 10/10 |
| 2018/0137512 A1 | 5/2018 | Georgiadis et al. |
| 2018/0165781 A1 | 6/2018 | Rodriguez et al. |
| 2018/0173871 A1 | 6/2018 | Toth |
| 2018/0181964 A1 | 6/2018 | Zagarese et al. |
| 2018/0204191 A1 | 7/2018 | Wilson et al. |
| 2018/0288033 A1 | 10/2018 | Kamal |
| 2018/0351747 A1 | 12/2018 | Spangemacher et al. |
| 2019/0087825 A1 | 3/2019 | Bhatt et al. |
| 2019/0089702 A1 | 3/2019 | Bhatt et al. |
| 2019/0166118 A1 | 5/2019 | Lee et al. |
| 2019/0190724 A1 | 6/2019 | Sundaresan et al. |
| 2019/0230496 A1 | 7/2019 | Wane |
| 2019/0245693 A1 | 8/2019 | Iyer et al. |
| 2019/0333054 A1 | 10/2019 | Cona et al. |
| 2020/0007322 A1 | 1/2020 | Weldemariam et al. |
| 2020/0076795 A1 | 3/2020 | Kamal |
| 2020/0322152 A1 | 10/2020 | Smets et al. |
| 2020/0374129 A1 | 11/2020 | Dilles et al. |
| 2021/0042600 A1 | 2/2021 | Jang |
| 2021/0319192 A1 | 10/2021 | Rodriguez et al. |
| 2021/0327547 A1 | 10/2021 | Praszczalek et al. |
| 2021/0383388 A1 | 12/2021 | Iyer et al. |
| 2021/0409397 A1 | 12/2021 | Bhatt et al. |

FOREIGN PATENT DOCUMENTS

| | | |
|---|---|---|
| WO | WO2008/061344 | 5/2008 |
| WO | WO2015/002608 | 1/2015 |
| WO | WO2018/022850 | 2/2018 |

OTHER PUBLICATIONS

U.S. Appl. No. 16/679,115, filed Nov. 8, 2019.
U.S. Appl. No. 15/476,526: (a) Office Action dated Aug. 31, 2018; (b) Office Action dated Feb. 11, 2019; and (c) Notice of Allowance dated Jul. 17, 2019. The instant application claims priority to U.S. Appl. No. 15/476,526.
U.S. Appl. No. 16/679,115: (a) Office Action dated Sep. 14, 2021; (b) Office Action dated Mar. 3, 2022; and (c) Notice of Allowance dated Jun. 29, 2022. The instant application is a continuation of U.S. Appl. No. 16/679,115.
PCT/US2018/019881: PCT International Search Report and Written Opinion dated May 7, 2018. PCT Patent Application No. PCT/US2018/019881 has the same priority claim as the instant application and the same Applicant, Mastercard International Incorporated.
EP 18710966.5: (a) Examination Report issued in EP18710966.5 dated Feb. 16, 2021; and (b) Summons to Attend Oral Proceedings dated Jul. 18, 2022. EP18710966.5 has the same priority claim as the instant application.
CN201880020952.6: Office Action dated Sep. 1, 2022. CN 201880020952.6 has the same priority claim as the instant application.
U.S. Appl. No. 15/891,062: (a) Office Action dated Oct. 17, 2019; (b) Office Action Feb. 20, 2020; (c) Office Action dated Aug. 14, 2020; and (d) Notice of Allowance dated Jun. 1, 2021. U.S. Appl. No. 15/891,062 has common subject matter as the instant application and the same Applicant, Mastercard International Incorporated.
PCT/US2019/013567: PCT International Search Report and Written Opinion dated Apr. 25, 2019. PCT/US2019/013567 has common subject matter as the instant application and the same Applicant, Mastercard International Incorporated.
BR112020016003-2: Notice of Allowance dated Mar. 3, 2022.

(56) References Cited

OTHER PUBLICATIONS

BR112020016003-2 has common subject matter as the instant application and the same Applicant, Mastercard International Incorporated.
EP19750802.1: Extended European Search Report dated Oct. 6, 2021. EP19750802.1 has common subject matter as the instant application and the same Applicant, Mastercard International Incorporated.
U.S. Appl. No. 16/134,348: (a) Office Action dated Jun. 25, 2020; (b) Office Action dated Dec. 2, 2020: and (c) Notice of Allowance dated May 26, 2021. U.S. Appl. No. 16/134,348 has common subject matter as the instant application and the same Applicant, Mastercard International Incorporated.
PCT/US2018/051468: PCT International Search Report and Written Opinion dated Jan. 10, 2019. PCT/US2018/051468 has common subject matter as the instant application and the same Applicant, Mastercard International Incorporated.
EP18789521.4: Intention to Grant dated Dec. 1, 2020; EP18789521.4 as common subject matter as the instant application and the same Applicant, Mastercard International Incorporated.
IN 202017006933: Examination Report dated Mar. 28, 2022. IN202017006933 has common subject matter as the instant application and the same Applicant, Mastercard International Incorporated.
AU2018333068: Examination Report dated Oct. 17, 2022. AU2018333068 has common subject matter as the instant application and the same Applicant, Mastercard International Incorporated.
U.S. Appl. No. 16/134,371: (a) Office Action dated Feb. 24, 2020; (b) Office Action dated Sep. 4, 2020; (c) Office Action dated Sep. 3, 2021; (d) Office Action dated Mar. 31, 2022; and (e) Office Action dated Jul. 21, 2022. U.S. Appl. No. 16/134,371 has common subject matter as the instant application and the same Applicant, Mastercard International Incorporated.
PCT/US2018/051474: PCT International Search Report and Written Opinion (10 pages) dated Jan. 8, 2019. PCT/US2018/051474 has common subject matter as the instant application and the same Applicant, Mastercard International Incorporated.
U.S. Appl. No. 16/838,666: (a) Office Action dated Dec. 8, 2021; (b) Office Action dated Apr. 21, 2022; and (c) Notice of Allowance dated Aug. 11, 2022. U.S. Appl. No. 16/838,666 has common subject matter as the instant application and the same Applicant, Mastercard International Incorporated.
EP19167933.1: Extended European Search Report dated Jul. 23, 2019; and (b) Examination Report dated Feb. 25, 2022. EP19167933.1 has common subject matter as the instant application and the same Applicant, Mastercard International Incorporated.
PCT/US2020/023072: International Search Report and Written Opinion (9 pages) dated Jun. 18, 2020. PCT/US2020/023072 has common subject matter as the instant application and the same Applicant, Mastercard International Incorporated.
U.S. Appl. No. 16/679,115, filed Nov. 8, 2019, Ashfaq Kamal.
U.S. Appl. No. 15/476,526, filed Mar. 31, 2017, Ashfaq Kamal.
U.S. Appl. No. 16/134,371, filed Sep. 18, 2018, Bhatt et al.
U.S. Appl. No. 16/134,348, filed Sep. 18, 2018, Bhatt et al.
U.S. Appl. No. 17/473,630, filed Sep. 13, 2021, Bhatt et al.
U.S. Appl. No. 15/891,062, filed Feb. 7, 2018, Iyer et al.
U.S. Appl. No. 17/409,530, filed Aug. 23, 2021, Iyer et al.
U.S. Appl. No. 16/838,666, filed Apr. 2, 2020, Smets et al.
F. No. K-11020/217/2018-UISAI (Auth-I), Government of India; https://uidai.gov.in/images/resource/UIDAI_Circular_11012018.pdf; Jan. 10, 2018; 5 pgs.
Times of India; Use 16-digit virtual No. for KYC; https://timesofindia.indiatimes.com/business/india-business/use-16-digit-virtual-no-for-kyc-fromtoday/articleshow/64810724.cms; web accessed Oct. 2, 2018; 56 pgs.
Economic Times; UIDAI introduces new two-layer security system to improve Aadhaar privacy; https://economictimes.indiatimes.com/news/economy/policy/uidai-introduces-new- two-layersecurity-system-to-improve-aadhaar-privacy/articleshow/62442873.cms; web accessed Oct. 2, 2018; 6 pgs.
"Moving Beyond Social Security Numbers"; Blake Hall; https://medium.com/@blake_hall/moving-beyond-social-security-numbers-part-3-283bbf28ce74; Oct. 11, 2017; 5 pgs.
"Are you overlooking toeknization as a data security measure?"; Linda Musthaler; https://www.networkworld.com/article/3002307/security/are-you-overlooking-tokenization- as-adata-security-measure.html; Nov. 6, 2015; 5 pgs.
"Digital Identity—Why Now?"; David G. W. Birch; https://www.paymentsnz.co.nz/ . . . /Digital_Identity_Seminar_Presentation_Final.pdf; Jan. 8, 2017; 79 pgs.
"Your guide to UPI—the world's most advanced payments system"; Sasi Desai et al.; https://medium.com/wharton-fintech/your-quide-to-upi-the-worlds-most-advanced-payments-system-b4e0b372bf0b: May 11, 2017; 20 pgs.
"Lessons from the World's Largest e-Identity Program"; procivis; https://procivis.ch/2018/02/13/lessons-from-the-worlds-largest-e-identity-program-indias-aadhaar/; Feb. 13, 2018; 6 pgs.
Times of India; "Treat virtual ID, UID token as Aadhaar number"; https://timesofindia.indiatimes.com/business/india-business/treat-virtual-id-uid-token-as-aadhaar-number-uidai-to-agencies/articleshow/65038574.cms: Jul. 18, 2018; 3 pgs.
Neustar; "Neustar Selected as Digital Identity Solution Partner for Visa's ID Intelligence Ecosystem"; https://www.home.neustar/about-us/news-room/press-releases/2017/VisaIDIntelligence: Oct. 24, 2017; 1 pg.
Crush Crypto; Selfkey ICO Review—Digital Identity Management System; https://crushcrypto.com/analysis-of-selfkey/; Dec. 5, 2017; 6 pgs.

\* cited by examiner

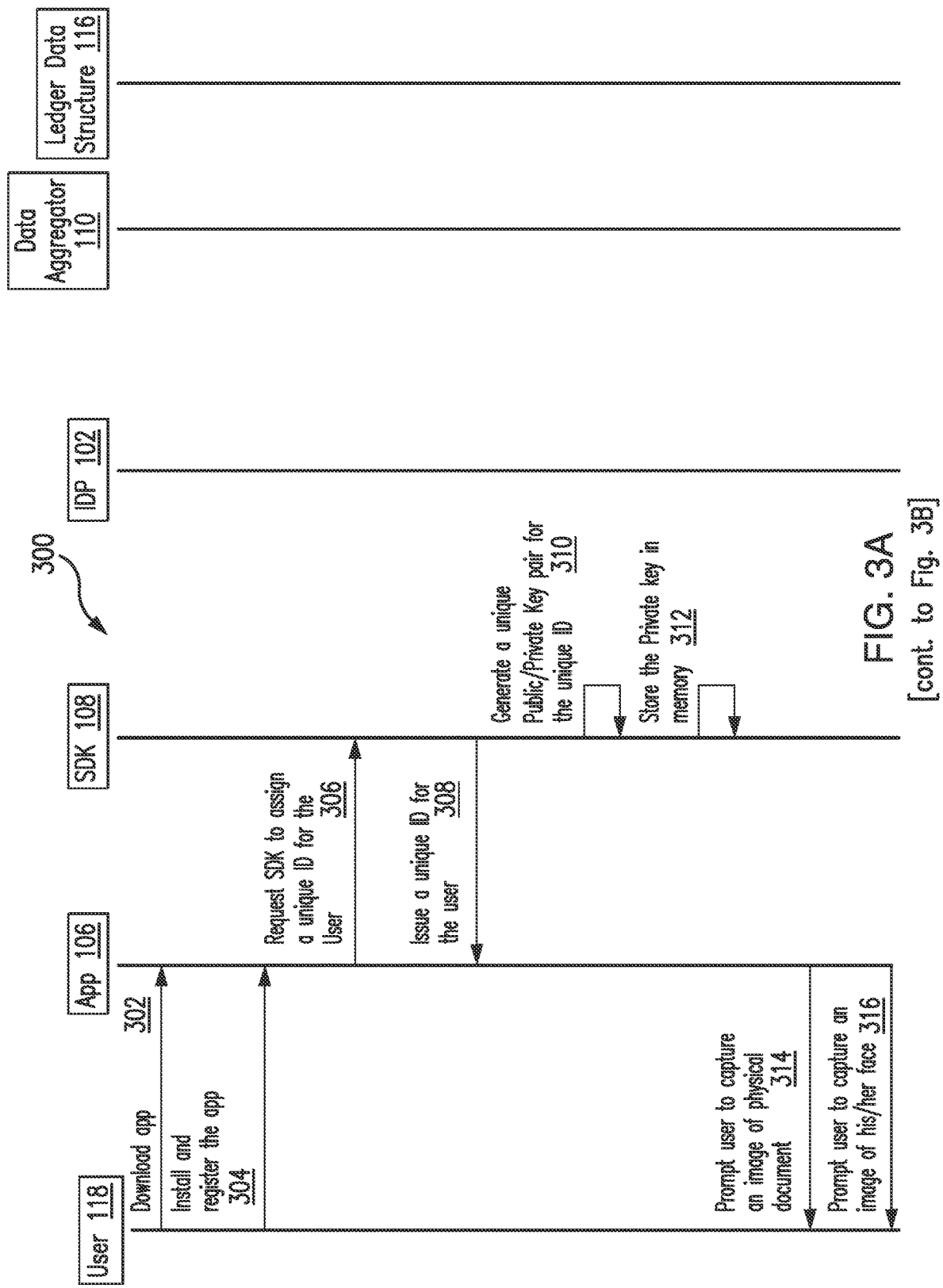

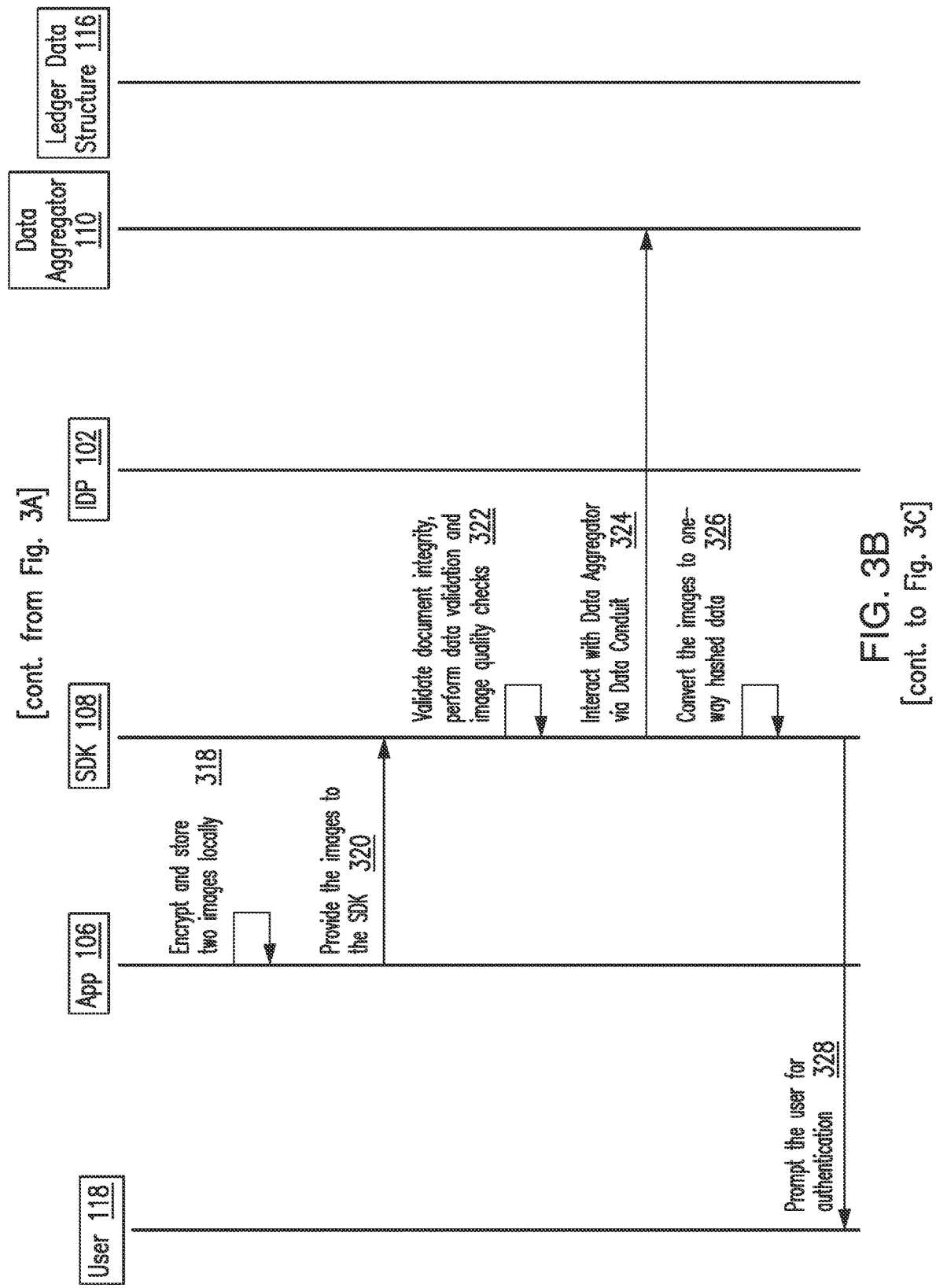

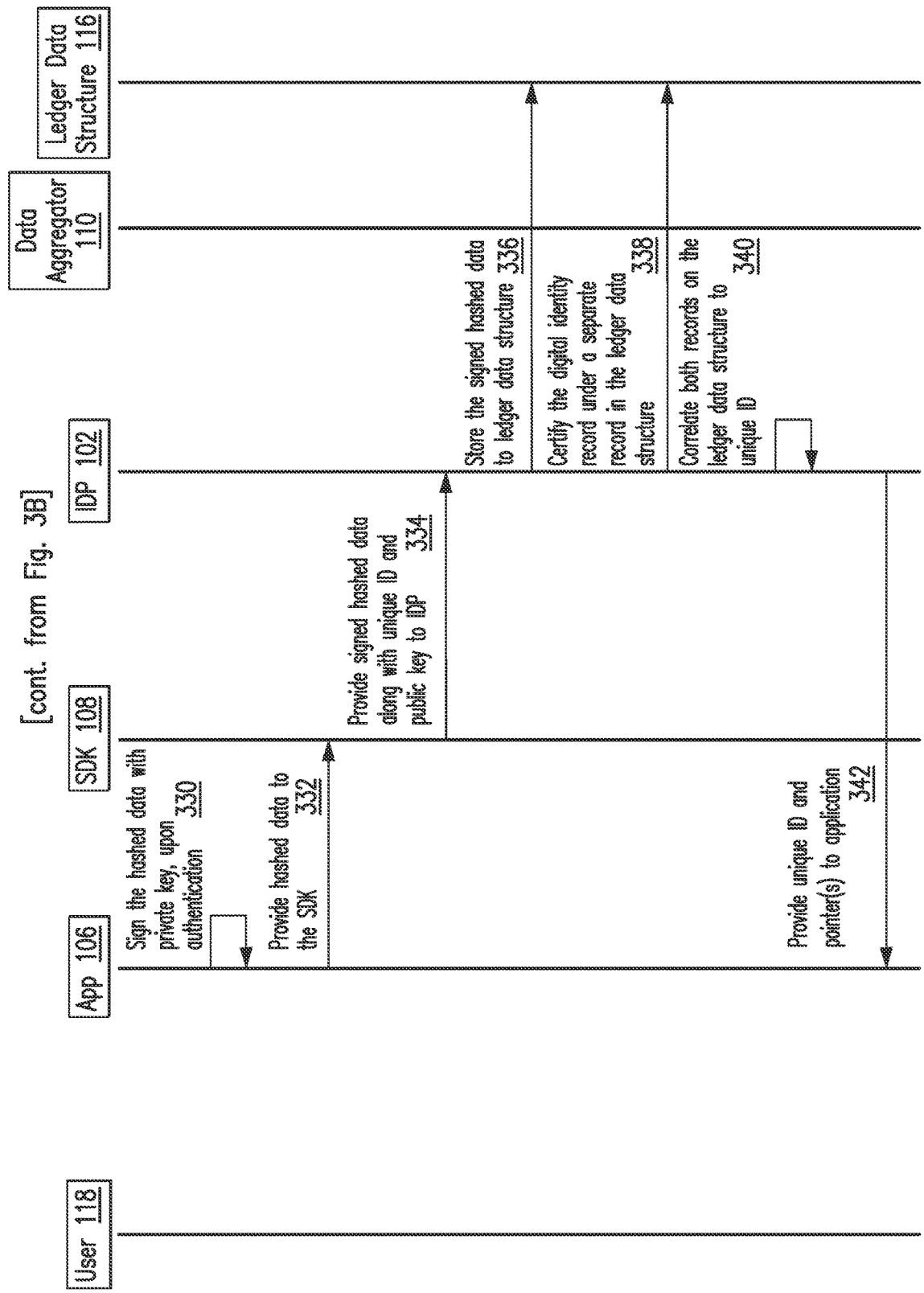

SYSTEMS AND METHODS FOR PROVIDING DIGITAL IDENTITY RECORDS TO VERIFY IDENTITIES OF USERS

CROSS-REFERENCE TO RELATED APPLICATIONS

This application is a continuation of U.S. patent application Ser. No. 16/679,115 filed on Nov. 8, 2019, which is a continuation of U.S. patent application Ser. No. 15/476,526 filed on Mar. 31, 2017. The entire disclosure of each of the above applications is incorporated herein by reference.

FIELD

The present disclosure generally relates to systems and methods for use in providing digital identity records for verifying identities of users, and, in particular, to systems and methods for use in compiling digital identity records, based on documents indicative of identities of associated users, and providing verification of the identities of the users based on the digital identity records, in response to requests for such verification.

BACKGROUND

This section provides background information related to the present disclosure which is not necessarily prior art.

People are known to open accounts and purchase products, actions for which identity verification is often required. For example, when a person opens a banking account with a banking institution, the banking institution typically requires the person to present identification, often in the form of a driver's license or other government issued document, prior to permitting the person to open the account. Such identification process may inhibit a person from opening a fraudulent account, when the person applying is not actually the person he/she claims to be, and/or using an unauthorized account to purchase products. More broadly, the identification process aids the banking institution in abiding by applicable rules and regulations regarding accounts issued thereby (e.g., related to anti-money laundering, anti-corruption, etc.). Often, this identification process is referred to as a "know your customer" or KYC process.

DRAWINGS

The drawings described herein are for illustrative purposes only of selected embodiments and not all possible implementations, and are not intended to limit the scope of the present disclosure.

Figure 1:
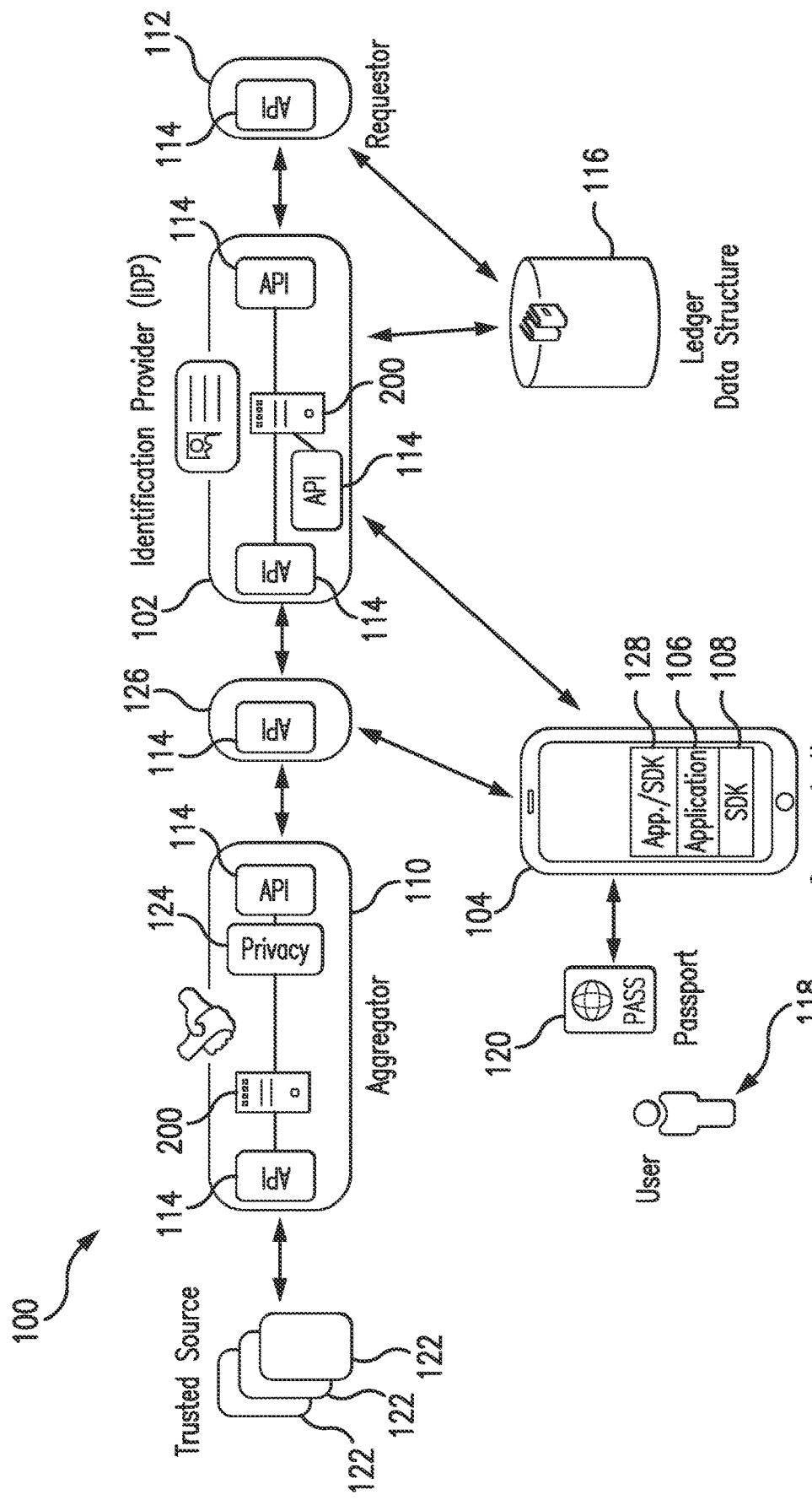
FIG. 1 is a block diagram of an exemplary system of the present disclosure suitable for use in providing digital identity verification of a user.
Figure 4:
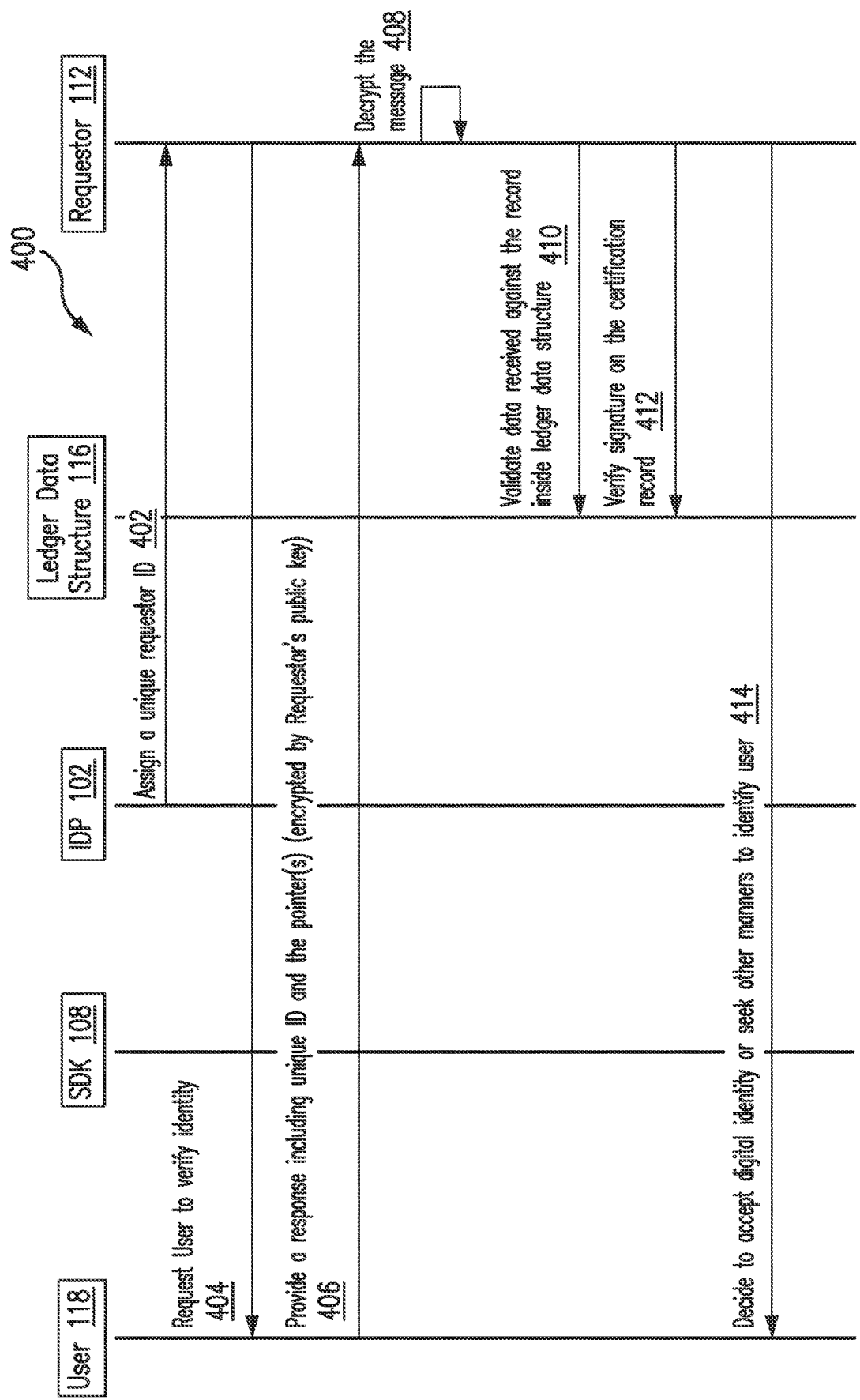

FIGS. 3A-3C include a flow diagram of an exemplary method, which may be implemented in connection with the system of FIG. 1, for compiling a digital identity record for a user, based on documents indicative of identity of the user, and storing the digital identity record in a ledger data structure; and FIG. 4 is a flow diagram of an exemplary method, which may be implemented in connection with the system of FIG. 1, for providing digital identity verification of a user based, at least in part, on a digital identity record.

Corresponding reference numerals indicate corresponding parts throughout the several views of the drawings.

DETAILED DESCRIPTION

Exemplary embodiments will now be described more fully with reference to the accompanying drawings. The description and specific examples included herein are intended for purposes of illustration only and are not intended to limit the scope of the present disclosure.

Many people apply for accounts, such as, for example, banking accounts, stock accounts, credit accounts, etc., where the people are required to provide proof of identity in connection with such applications. When institutions with which the people seek the accounts are local to the people, and/or are convenient to reach, the presentation of documents providing the proof of identity is generally not an issue. However, where the institutions are located away from the people, or the people are limited in their ability to travel, or where electronic communications are more convenient, the presentation of documents, in person, may be different, troublesome, and/or impractical. Uniquely, the systems and methods herein provide digital identity verification for users, where such verification generally includes confirming physical documents associated with the users to distinguish the users from other users. In particular, a user's communication device includes a software development kit (SDK), which operates to assign a unique identifier (ID) to the user and also to assign a unique public/private key pair to the unique ID. The SDK, through the communication device, causes an image of a physical document and an image of the user to be captured, which are then validated. Once validated, the SDK converts the images to hashed data (i.e., hashes the images) and then, after authentication of the user at the communication device, provides the hashed data, the public key and the unique ID for the user to an identification provider (IDP). The IDP stores the same in a ledger data structure as a digit identity record and further certifies the record using a private key. And, the IDP provides pointer(s) to the ledger data structure, for the record and the certification (which is encrypted by the user's public key).

Then in the systems and methods herein, when the user desires to open an account with an institution (broadly, with a requestor), the user provides to the institution the pointers to the ledger data structure, via the communication device, which are then used, by the institution, to request verification of the user through the IDP. The IDP responds with a verification, as appropriate, thereby permitting the institution to in turn verify the identity of the user without having to actually view the physical documents associated with the user. In this manner, the user is able to more efficiently provide proof of identity to the institution, while the institution is more efficiently able to verify the user when the user is not physically present at the institution.

FIG. 1 illustrates an exemplary system 100, in which the one or more aspects of the present disclosure may be implemented. Although the system 100 is presented in one arrangement, other embodiments may include the parts of the system 100 (or other parts) arranged otherwise depending on, for example, a particular type of requestor of user validation, privacy requirements, a number of participants in validation processes, data relied on for validation, etc.

The system 100 generally includes an identification provider (IDP) 102, a communication device 104 including an application 106 and an SDK 108, a data aggregator 110, and a requestor 112, each coupled to (and in communication with) one or more networks. The networks, indicated generally by arrowed lines in FIG. 1, may include one or more of, without limitation, a local area network (LAN), a wide area network (WAN) (e.g., the Internet, etc.), a mobile network, a virtual network, and/or another suitable public and/or private network capable of supporting communication among two or more of the parts illustrated in FIG. 1, or any combination thereof.

The IDP 102 is configured to interact with the SDK 108 included in the communication device 104. The IDP 102 may be a standalone service and/or entity. Additionally, or alternately, the IDP 102 may be incorporated, in whole or in part, with another entity, such as, for example, a payment network or a banking institution, etc. As shown, the IDP 102 includes a computing device 200, which is shown in detail in FIG. 2 (and described in more detail below), and multiple application programing interfaces or APIs 114. While not required, the embodiment shown in FIG. 1 relies on the APIs 114 to permit communication of data, for example, through and/or among the parts of the system 100 (with each of the data aggregator 110 and the requestor 112 also illustrated as including APIs 114 to facilitate such communication). In other embodiment, however, the IDP 102, and other parts of the system 100, may communicate otherwise. In the illustrated system 100, each of the APIs 114 included in the IDP 102 are included in or associated with the computing device 200.

In addition, the IDP 102 is associated with a ledger data structure 116, which is configured to be in communication with the IDP 102 (and/or a requestor 112, etc.), either directly or through the network. The ledger data structure 116 is configured to store digital identity records and corresponding certification records (together or separately). In this exemplary embodiment, the ledger data structure 116 includes a block chain data structure, whereby the ledger data structure 116 includes a continually growing list of ordered records (where each record includes a time stamp and a reference or link to a prior record). That said, it should be understood that other, equivalent or not, data structures may be employed in other embodiments.

The communication device 104 is associated with a user 118, who possesses an identity. In general, the identity of the user 118 indicates and/or includes (without limitation) a name of the user 118, an address of the user 118, a social security number or other government identification number for the user 118, etc. The identity of the user 118 may be evidenced by a number of physical documents, such as, for example, a passport 120 as included in FIG. 1, a national ID card issued by a government, a driver's license issued by a state, regional, or federal government (or other government issued ID), or other document generally including an image of the user 118 or other identification, etc. Still other physical documents may include a social security card for the user 118, a health insurance card, bank statements/documents, a credit or debit card, an employee ID, a library card, a utility bill, etc., all of which may be used alone, or in combination, as described herein. For example, the passport 120 may be presented by the user 118, alone or along with a utility bill, to the requestor 112, to confirm the identity to the user 118 when desired by the requestor 112.

Within the communication device 104, in this exemplary embodiment, the application 106 may include any application downloaded to, installed and/or active in the communication device 104. In general, the application 106 relates to financial accounts, such that the application 106 is associated with security and/or verification of the user's identity. For example, the application 106 may be associated with a banking institution (where the banking institution is also the requestor 112), or another banking institution. Alternatively, the application 106 may be unrelated to one or more financial accounts, i.e., a general purpose application, where the application 106 may incorporate other functions unrelated to financial accounts, or provide a stand-alone identity application (which may be relied upon by the requestor 112 (e.g., banking institutions, insurance agencies, or others, etc.)). The SDK 108 then is incorporated, in whole or in part, with the application 106, such that the SDK 108 cooperates with the application 106 to cause one or more interfaces to be displayed to the user 118, at the communication device 104. In connection therewith, the SDK 108 configures the communication device 104 to communicate with the IDP 102, via one or more of the APIs 114 included therein. With that said, when the communication device 104 is described as configured to perform various operations herein, it should be appreciated that it may be doing so generally through coordination between the application 106 and/or the SDK 108 (even if the application 106 and/or the SDK 108 are not specifically referenced herein), or by either independent of the other.

In this exemplary embodiment, the data aggregator 110 of the system 100 is configured to aggregate known assertions and/or data related to users, including the user 118. The data aggregator 110 is coupled to multiple trusted sources 122, which provide and/or are associated with, for example, social data (e.g., via one or more social networks, etc.), financial data (e.g., via one or more banks, etc.), and mobile operator network (MNO) data (e.g., via a telecommunication company, etc.), etc. In particular, however, the data aggregator 110 generally relies on one or more machine learning algorithms to determine what data about the user 118 (and available from the trusted sources 122) to collect. The data provided from the trusted sources 122, regarding the user 118, may provide different personas for the user 118, including, for example, a social persona, a financial persona, a MNO persona, etc. Based on the content received from the trusted sources 122 and/or one or more scoring and/or risk assessment algorithms/rules relying on such content, the data aggregator 110 is configured to generate an indicator of trust for the identity of the user 118, such as, for example, a score indicative of whether the identity of the user should be verified, or not (e.g., indicative of whether the user 118 is who he/she says he/she is, etc.). The data aggregator 110 may further be configured to implement one or more privacy preserving data retrieval functions, specifically, in a privacy application 124 thereof (e.g., a privacy API, etc.), for one or more of the trusted sources 122, as necessary, required, or desired. Specifically, for example, the privacy application 124 may be configured to employ a set of standard data query mechanisms, whereby data specific to the user 118 is anonymized and, generally, thereby cannot be traced back to the actual user 118. While the privacy application 124 is only included in the data aggregator 110, it should be understood that it (or similar applications) may be included elsewhere in the system 100, as necessary, required, or desired.

In addition, as it relates to privacy, the system 100 further includes a personal data conduit 126, and a dedicated application/SDK 128 included in the communication device 104. The dedicated application/SDK 128 may be integrated into the application 106 (i.e., a dedicated SDK) or stand-alone from the application 106 (i.e., an application). The application/SDK 128 configures the communication device 104 to communicate with the personal data conduit 126, which in turn, includes an API 114 in order to pass, upon permission and/or consent from the user 118, personal identifying data from the communication device 104 to the data aggregator 110. The data aggregator 110 will, as described above, then collect data related to the user 118 based on the personal identifying data (e.g., from the trusted sources 122, etc.). Again, while the API 114 at the personal data conduit 126 is relied upon in this embodiment for communication between the personal data conduit 126 and the application/SDK 128 and/or between the personal data conduit 126 and the aggregator 110, the personal data conduit 126 may communicate otherwise in other embodiments. Further, the personal data conduit 126, in this example, as shown in FIG. 1, is separate and distinct from the IDP 102 and the aggregator 110. That said, it should be appreciated that in one or more other embodiments, the personal data conduit 126 may be included in the IDP 102 or the data aggregator 110, and the application/SDK 128 may be included into the application 106 and/or the SDK 108, as appropriate or desired And, the requestor 112 of the system 100 may include, for example, an entity that offers one or more services (e.g., digital services, etc.), such as, for example, bank accounts, insurance services, mortgage services etc. The requestor 112, in general, is required, or at least is encouraged, to verify the identity of the user 118 when the user 118 attempts to enroll to one or more of the digital services offered by the requestor 112. The requestor 112, as shown in FIG. 1, includes the API 114, whereby a request for such verification of the user 118 may be provided via the API 114 to the IDP 102. Again, while the API 114 is included in this embodiment for such communication between the requestor 112 and the IDP 102, the requestor 112 may communicate with the IDP 102 otherwise in other embodiments.

With continued reference to FIG. 1, prior to an interaction between the user 118 and the requestor 112 for one or more desired services, or as part thereof, the user 118 includes (e.g., via download, etc.) and/or installs the application 106 in the communication device 104. In response, the communication device 104 is configured to perform certain operations, as provided by the application 106 and/or the SDK 108 associated therewith. Specifically, the application 106 and/or the SDK 108 include computer-executable instructions, which cause the communication device 104 to assign a unique ID to the user 118 and generate a public key and private key pair for the user 118, which is tied to the unique ID. The unique ID and public/private key pair are stored in memory (e.g., a memory 204, etc. as described below), in the communication device 104. The communication device 104, as configured by the application 106 and/or SDK 108, then prompts the user 118 to capture an image of a physical document indicative of an identification of the user 118 (e.g., the passport 120, a national ID, etc.) and also to capture an image of the user 118 (e.g., a selfie, etc.), and, potentially, to capture further images of other physical documents, etc.

Once captured, the communication device 104, again as configured by the application 106 and/or SDK 108, stores the images and validates and/or quality checks the images. If the images cannot be validated (or sufficiently validated) at the communication device 104, the communication device 104 may be configured to communicate with the data aggregator 110, via the data conduit 126, to validate and/or confirm the physical document(s) included in the image(s) and/or the identity of the user 118. In particular, the data conduit 126 is configured to interact with the application/SDK 128 to solicit consent from the user 118 (e.g., via a message such as "Local Verification Not Completed. Do you consent to Verification at a Data Aggregator 110?"; etc.). If the user 118 consents, the data conduit 126 is configured to interact with the application/SDK 128 to retrieve person identifying data from the communication device 104 (for the user 118) and to provide the information to the data aggregator 110, via the API 114 therein, for use in generating an indicator of trust for the identity of the user 118. The indicator of trust is returned to the communication device 104 and/or to the IDP 102 (via the communication device 104, or directly), whereupon validation of the images and/or verification of the identity of the user 118 may be confirmed, or not.

Once the image(s) are validated and/or quality checked, the communication device 104, as configured by the application 106 and/or SDK 108, converts the images to data based on a one-way hash function (e.g., a SHA hash function, etc.) (i.e., hashes the image data). The communication device 104 is configured, by the application 106 and/or SDK 108, to then authenticate the user 118 (e.g., via a biometric, etc.), to then sign the hashed data with the private key stored in the memory, and to transmit the unique ID of the user 118, the signed hashed data, and the public key to the IDP 102, via the API 114.

In response, the IDP 102 is configured to write a digital identity record to the ledger data structure 116, which includes the unique ID of the user 118, the signed hashed data, and the public key of the user 118. The IDP 102 may further store the images of the physical documents and/or the user 118, and also the name, address, citizenship, etc., for the user 118 (as received or derived from the images). In additional, the IDP 102 is configured to certify the digital identity record under a separate record written by the IDP 102 to the ledger data structure 116 (i.e., an IDP certification record). In so doing, each of the records is tied to the unique ID of the user 118 and is associated with a pointer or other identifier of the location of the records in the ledger data structure 116. Specifically, for example, the pointer is associated with one location in the ledger structure 116, which contains a sealed record including the digital identity record (e.g., the public key of the user 118, the hashed version of the physical documents and/or image of the user 118, etc.), biometric data for the user 118, and a pointer to the certification record. It should be appreciated that the location, to which the pointer points, may include the user's public key, a hashed version of the public key, or otherwise.

The IDP 102 is configured to then encrypt the unique ID and/or the pointer(s), and to transmit it/them to the communication device 104. The communication device 104, in turn, is configured to store the unique ID and/or pointers in memory.

Subsequently, or as part of the above, the requestor 112 is configured to seek verification of the identity of the user 118. Specifically, the requestor is configured to request that the user 118, via the communication device 104, verify his/her identity. In response the communication device 104, as configured by the application 106 and/or SDK 108, authenticates the user 118 to the communication device 104 and then, upon authentication, responds with the unique ID of the user 118 and the pointer(s) for the ledger data structure 116 to the digital identity record (and the IDP certification record) (and encrypts the unique ID and pointer(s), prior to transmitting to the requestor 112). The requestor 112 is configured to decrypt and validate the digital identity record and the IDP certification record included in the ledger data structure 116, via the IDP 102, prior to making a decision to accept the identity of the user 118 and enroll the user 118 in the desired services, or not.

While only one IDP 102, one data aggregator 110, one ledger data structure 116, one user 118, three trusted sources 122, and one data conduit 126 are illustrated in FIG. 1, it should be appreciated that any number of these entities (and their associated components) may be included in the system 100, or may be included as a part of systems in other embodiments, consistent with the present disclosure. Likewise, it should be appreciated that the system 100 and other system embodiments will generally include multiple users, multiple communication devices, and multiple requestors, each generally consistent with the description above.

Figure 2:
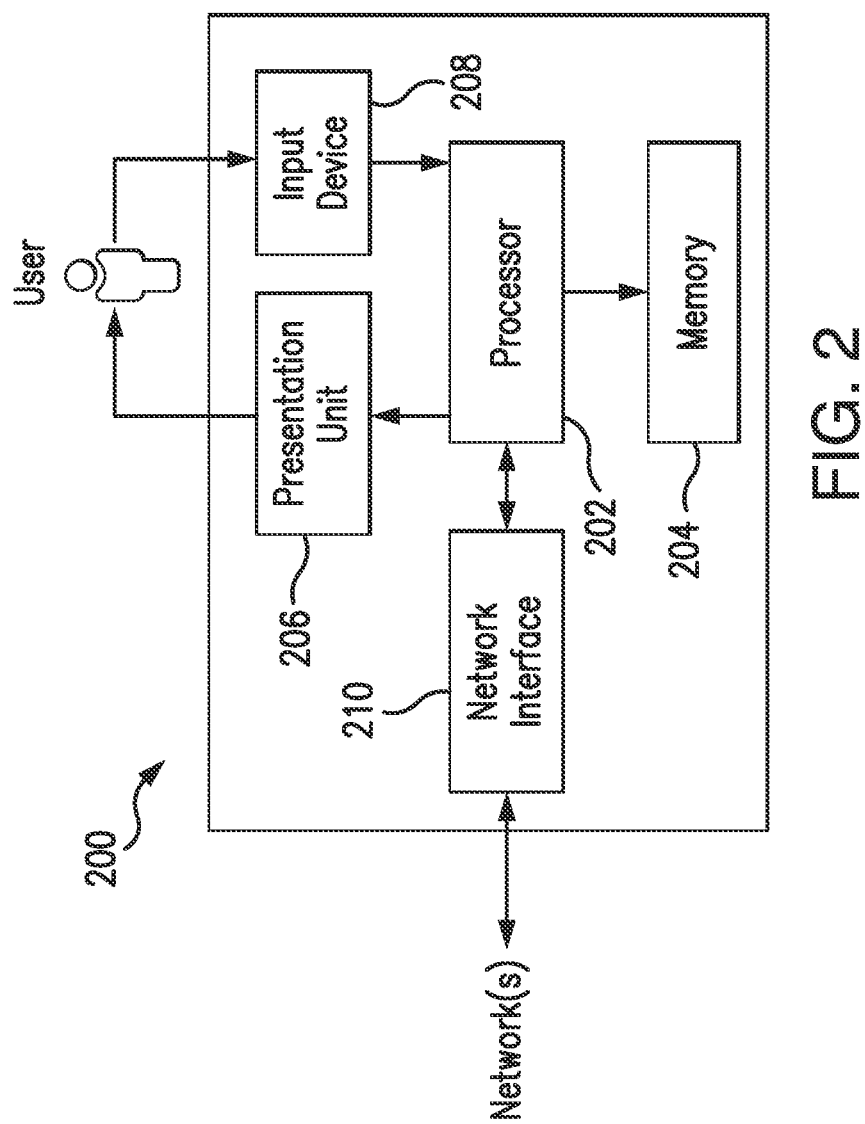
FIG. 2 is a block diagram of a computing device that may be used in the exemplary system of FIG. 1.

FIG. 2 illustrates an exemplary computing device 200 that can be used in the system 100 of FIG. 1. The computing device 200 may include, for example, one or more servers, workstations, personal computers, laptops, tablets, smartphones, PDAs, etc. In addition, the computing device 200 may include a single computing device, or it may include multiple computing devices located in close proximity or distributed over a geographic region, so long as the computing devices are specifically configured to function as described herein. In the exemplary embodiment of FIG. 1, each of the IDP 102 and the data aggregator 110 are illustrated as including, or being implemented in, computing device 200, coupled to (and in communication with) one or more networks. In addition, the communication device 104 associated with user 118 can also be considered a computing device consistent with computing device 200 for purposes of the description herein. Also, while not illustrated, the requestor 112 and the trusted sources 122 are each generally implemented in a computing device, which may be consistent with the computing device 200. However, the system 100 should not be considered to be limited to the computing device 200, as described below, as different computing devices and/or arrangements of computing devices may be used. In addition, different components and/or arrangements of components may be used in other computing devices.

Referring to FIG. 2, the exemplary computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, images, private and/or public keys, public/private key pairs, identity records, certified and/or certification records, hashed data, signed data, and/or other types of data (and/or data structures) suitable for use as described herein. Furthermore, in various embodiments, computer-executable instructions may be stored in the memory 204 for execution by the processor 202 to cause the processor 202 to perform one or more of the functions described herein, such that the memory 204 is a physical, tangible, and non-transitory computer readable storage media. Such instructions often improve the efficiencies and/or performance of the processor 202 and/or other computer system components configured to perform one or more of the various operations herein. It should be appreciated that the memory 204 may include a variety of different memories, each implemented in one or more of the functions or processes described herein.

In the exemplary embodiment, the computing device 200 also includes a presentation unit 206 that is coupled to (and that is in communication with) the processor 202 (however, it should be appreciated that the computing device 200 could include output devices other than the presentation unit 206, etc.). The presentation unit 206 outputs information (e.g., verification of the user's identity, etc.), visually, for example, to a user associated with the requestor 112, etc. And, various interfaces (e.g., as defined by the application 106 and/or SDK 108, as defined by websites, etc.) (e.g., including instructions to capture images of documents, capture selfies, capture biometrics, etc.) may be displayed at computing device 200, and in particular at presentation unit 206, to display certain information. The presentation unit 206 may include, without limitation, a liquid crystal display (LCD), a light-emitting diode (LED) display, an organic LED (OLED) display, an "electronic ink" display, speakers, etc. In some embodiments, presentation unit 206 includes multiple devices.

In addition, the computing device 200 includes an input device 208 that receives inputs from a user (i.e., user inputs) such as, for example, images of documents, images of the user 118 (and/or biometrics therefor), etc. in response to prompts from the application 106 and/or SDK 108, as further described below. The input device 208 may include a single input device or multiple input devices. The input device 208 is coupled to (and is in communication with) the processor 202 and may include, for example, one or more of a keyboard, a pointing device, a mouse, a stylus, a camera, fingerprint scanner, a touch sensitive panel (e.g., a touch pad or a touch screen, etc.), another computing device, and/or an audio input device. In various exemplary embodiments, a touch screen, such as that included in a tablet, a smartphone, or similar device, behaves as both a presentation unit and an input device.

Further, the illustrated computing device 200 also includes a network interface 210 coupled to (and in communication with) the processor 202 and the memory 204. The network interface 210 may include, without limitation, a wired network adapter, a wireless network adapter (e.g., a near field communication (NFC) adapter, a Bluetooth adapter, etc.), a mobile network adapter, or other device capable of communicating to one or more different ones of the networks herein. Further, in some exemplary embodiments, the computing device 200 includes the processor 202 and one or more network interfaces incorporated into or with the processor 202. In various embodiments, the computing device 200 includes a global positioning system (GPS) capability whereby the computing device 200 may determine its current geographic location, perform mapping applications, etc.

FIGS. 3A-3C illustrate an exemplary method 300 for use in compiling and storing a digital identity record. The exemplary method 300 is described as implemented in the IDP 102, the SDK 108 and the ledger data structure 116 of the system 100, in conjunction with the data aggregator 110. Reference is also made to the computing device 200. However, the methods herein should not be understood to be limited to the system 100 or the computing device 200, as the methods may be implemented in other systems and/or computing devices. Likewise, the systems and the computing devices herein should not be understood to be limited to the exemplary method 300.

In the exemplary method 300, the requestor 112 is described with reference to a banking institution, which offers new accounts to users through a website associated with the banking institution. That said, other requestors may offer other services and still be subject to the method 300 and/or to other methods consistent with the description herein.

Prior to opening a new account with the requestor 112, the user 118 pursues a digital identity, provided by the IDP 102, to thereby streamline and/or obviate certain identity verification interactions with the requestor 112. In doing so, the user 118 downloads the application 106, at 302, and proceeds to install and register the application 106, at 304, at the communication device 104. In response, the application 106 requests the SDK 108 (via the communication device 104) to assign a unique ID to the user 118, at 306, whereupon, at 308, the SDK 108 issues the unique ID for the user 118.

Thereafter, the SDK 108 generates, at 310, a public/private key pair, which is tied to the unique ID. The public/private key pair may be generated based on any technique, including, for example, the RSA technique, the DSA technique, or the ECDSA technique, where the particular technique and a length of the key pair may be selected by those skilled in there art based on desired or required entropy, secrecy, and/or uniqueness. In at least one embodiment, the SDK 108 generates the public/private key pair prior to assigning the unique ID, and assigns the public key to be the unique ID for the user 118 and/or derives one from the other.

With regard to the public/private key pair, the private key is then stored, by the SDK 108, at 312, in memory (e.g., the memory 204, etc.) in the communication device 104.

Separately, in this embodiment, the application 106 prompts, at 314, the user 118 to capture an image of his/her passport 120 or other physical document indicative of the identity of the user 118 (e.g., a national ID card, etc.). In response, the user 118 directs the camera input device 208 (or other input device 208) of the communication device 104 to the physical document and captures the image. Further, the application 106 prompts, at 316, the user 118 to capture an image of his/her face (e.g., a selfie, etc.). In response, again, the user 118 directs the camera input device 208 (or other input device 208) of the communication device 104 to his/her face and captures the image. The application 106 (or SDK 108) then encrypts the two images and stores, at 318, the encrypted images locally on the communication device 104, in memory 204, for example. The application 106 also passes, at 320, the two images, i.e., one of the physical documents and the other one of the user 118, to the SDK 108.

In turn in the method 300, the SDK 108 validates the integrity of the two images, at 322. In particular, the SDK 108 determines the integrity of the images based on, for example, ICAO 9303 standard or one or more other suitable standards. The SDK 108 further performs quality checks on the images to ensure the integrity and/or validation of the images may be performed based on one or more suitable standards known to those skilled in the art. Also, the SDK 108 performs validation between the images (e.g., the first image against the second image, or vice-versa, etc.). Specifically, the SDK 108 creates a template based on the image of the user 118 included in the document image, and then compares, based on techniques known to those skilled in the art, the "selfie" image captured by the communication device 104 to the template. Further, for example, the SDK 108 may employ optical character recognition, or OCR, to the images to find characters (e.g., words, names, addresses, telephone numbers, heights, weights, eye colors, identification numbers, etc.), in one or both images for use in validating the images (e.g., based on the information contained therein, etc.). Based on the determined integrity, quality and/or biometric validation, the SDK 108 is able to, or not, validate the integrity of the images.

In this exemplary embodiment, if the validation, at 322, fails, the SDK 108 informs the application/SDK 128 of the failed validation, whereupon the personal data conduit 126 optionally interacts with the data aggregator 110, via the application/SDK 128, at 324, to further validate the identity of the user 118. In particular, the application/SDK 128 is invoked, by the failed validation, whereupon the application/SDK 128 prompts the user 118, at the communication device 104, to provide permission and/or consent to seek validation through the aggregator 110 (e.g., by providing personal identifying data, etc.). Upon consent, the application/SDK 128 gathers the personal identifying data (as needed, or desired) from the communication device 104 and provides the same, via the personal data conduit 126, to the data aggregator 110. In turn, the data aggregator 110 interacts with the trusted sources 112, based on the personal identifying data and/or one or more machine learning algorithms, to collect data related to the identity of the user 118. Thereafter, based on one or more rules, the data aggregator 110 determines and returns an indicator of trust (e.g., a score, etc.) for the user 118 back to the communication device 104 and/or the IDP 102, whereby the process may be continued when the indicator of trust satisfies one or more thresholds (and/or manual reviews).

Then, once the integrity of the images is validated (or the identity of the user 118 is otherwise validated), the SDK 108 converts, at 326, the images to hashed data. The SDK 108 may utilize, for example, a SHA hash function (e.g., SHA 256, etc.) to convert the images to one-way hashed data. The SDK 108 then prompts, at 328, the user 118, via the application 106, to authenticate himself/herself, for example, by a biometric and/or personal identification number (PIN), etc. The application 106 relies on a biometric or PIN registered to the communication device 104 and/or the application 106 upon installation and/or registration (e.g., an unlock biometric for the communication device 104, etc.). In response, the user 118 provides the requested biometric or PIN, which, when matching the registered biometric or PIN, provides authentication of the user 118. Once the user 118 is authenticated, the application 106 signs, at 330, the hashed data with the private key, stored in the memory (e.g., the memory 204, etc.) in the communication device 104, and provides, at 332, the signed hashed data to the SDK 108.

Next, the SDK 108 provides, at 334, the signed hashed data, the unique ID for the user 118 and the public key for the user 118 to the IDP 102. Upon receipt, the IDP 102 stores the signed hash data (as part of a digital identity record for the user 118) to the ledger data structure 116, at 336. In this manner, the image data as encrypted is also stored at the ledger data structure 116. Because the data structure 116, in this embodiment, includes a block chain data structure, the signed hash data is stored in the data structure 116 in association with a pointer, identifying the digital identity record's location. The pointer may be, for example, the public key of the user 118, or may, in other examples, be dependent on the user's public key (e.g., determined or derived therefrom, etc.), or not. Other data structures may include a pointer (e.g., derived from the public key, or unique ID, or not; etc.) or other identification of the location of the signed hashed data. Further, the IDP 102 also certifies, at 338, the digital identity record under a different entry in the ledger data structure 116, using the private key, which is also associated with the pointer, in this embodiment. It should be appreciated that in one or more other embodiments another entity may be involved in certifying the record in the ledger data structure 116, where that entity may be associated with a public/private key pair for use in certifying the record.

The IDP 102 then associates, at 340, both of the records, in the ledger data structure 116, to the user 118, and specifically, to the unique ID assigned to the user 118. The unique ID and pointer(s) are then provided, by the IDP 102, at 342, back to the application 106. In several embodiments, the pointer associated with the certification by the IDP 102 may be included in the digital identity record, such that only the pointer associated with the digital identity record need be provided back to the application 106. The unique ID and/or the pointer(s) may be encrypted, by use of the user's public key, or not, when transmitted. The pointer(s) are then stored in memory 204 of the communication device 104, for use in verifying the identity of the user 118 in connection with the requestor 112.

FIG. 4 illustrates an exemplary method 400 for use in providing digital identity verification, in connection with a user requesting a digital service from a requestor (e.g., a new account, etc.). The exemplary method 400 is described as implemented in the IDP 102, the SDK 108 and the ledger data structure 116 of the system 100, in conjunction with the requestor 112. Reference is also made to the computing device 200. However, the methods herein should not be understood to be limited to the system 100 or the computing device 200, as the methods may be implemented in other systems and/or computing devices. Likewise, the systems and the computing devices herein should not be understood to be limited to the exemplary method 400.

In connection with the user 118 requesting a digital service form the requestor 112, or prior thereto, the IDP 102 assigns a unique requestor ID to the requestor 112, at 402. And, the requestor 112 provides a request to the user 118 to verify his/her identity, at 404. When the requestor 112 is associated with the application 106, the request may be provided through the application 106. Alternatively, when the requestor is un-associated with the application 106, the requestor 112 may provide the request to the IDP 102, which in, turn, provides the request to the user 118 at the application 106.

In response, the user 118 is prompted (not shown), by the communication device (and in particular, the application 106 and/or SDK 108) to authenticate himself/herself. The authentication may be similar to the biometric or PIN authentication referenced at 328 in the method 300 of FIG. 3. Once authenticated, the user 118 then, via the communication device 104, and in particular, the application 106, provides, at 406, a response to the requestor 112. The response includes the user's unique ID, and the pointer(s) received from the IDP 102, in method 300. The response may further include a name, an address, etc. associated with the user 118, or not. The response, in this example, is further encrypted (using the user's public key at the communication device 104). At 408, the requestor 112 decrypts the response and retrieves the digital identity record from the ledger data structure 116 based on the pointer and unique ID. Then, the requestor 112 validates, at 410, enrollment data received in connection with the user 118 requesting the digital service based on the content of the digital identity record. The requestor 112 further retrieves the certification record based on a second pointer (from the response or included in the digital identity record) and verifies, at 412, the signature on the certification record based on the public key of the IDP 102 or other entity which certified the record in the ledger data structure 116, or otherwise.

Based on the above, at 414, the requestor 112 may decide to accept the digital identity of the user 118 and proceed in enrolling the user 118 in the digital service or other suitable service. Or alternatively, at 414, the requestor 112 may seek additional and/or other manners of identifying the user 118.

In view of the above, the systems and methods herein provide for digital identity verification. As part thereof, a user is able to participate in the creation of a digital identity record, which is based on one or more physical documents associated with the user. The digit identity record is maintained in a manner that provides for privacy and/or security thereof (e.g., protection from fraudulent use, etc.), etc.

Again and as previously described, it should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the following operations: (a) generating, by a computing device, a unique ID for a user; (b) generating, by the computing device, a public/private key pair associated with the unique ID for the user; (c) receiving, at the computing device, at least two images, a first image associated with a document indicative of an identification of the user and the second image including an image of the user; (d) validating an integrity of the first image; (e) converting, by the computing device, at least the first image to one-way hashed data, when the integrity of the first image is validated; and (f) transmitting the hashed data signed with the private key, the unique ID and the public key to an identification provider, whereby a validation record of the user is able to be stored in a ledger data structure.

Exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for use in verifying an identity of a user, the method comprising:
    requesting, by an application in a mobile device of a user, a unique ID for the user, from a software development kit (SDK), which is included in the application;
    issuing, by the SDK in the mobile device, the unique ID for the user;
    generating, by the SDK in the mobile device, a public/private key pair specific to the unique ID, the public/private key pair including a public key and a private key;
    prompting, by the application in the mobile device, the user to capture a first image of a government issued document and a second image of a face of the user;
    capturing, by the mobile device, the first image of the government issued document, the government issued document including a biometric reference of the user and indicating an identity of the user, the first image including at least the biometric reference of the user from the government issued document;
    capturing, by the mobile device, the second image of the face of the user;
    validating, by the mobile device, the identity of the user based on a comparison of the second image of the face of the user and the first image of the government issued document; and
    based on the validation of the identity of the user:
        converting, by the SDK in the mobile device, the first image via a one-way hash function;
        signing, by the mobile device, the hashed first image with the private key of the public/private key pair; and
        transmitting, by the SDK in the mobile device, the signed hashed first image, the unique ID, and the public key of the public/private key pair to an identification provider, whereby a digital identity record including the signed hashed first image for the user is stored in a ledger data structure.

2. The computer-implemented method of claim 1, wherein generating the public/private key pair includes generating the public/private key pair based on the unique ID.

3. The computer-implemented method of claim 1, wherein the application includes a banking institution application associated with a banking institution, which is distinct from a requestor.

4. The computer-implemented method of claim 1, wherein prompting, by the application in the mobile device, the user to capture the first image of the government issued document and the second image of the face of the user includes prompting the user to capture the first image and the second image, via a camera input device of the mobile device.

5. The computer-implemented method of claim 1, wherein transmitting the signed hashed first image, the unique ID, and the public key of the public/private key pair to the identification provider includes transmitting, via an application programming interface (API) associated with the identification provider, the signed hashed first image, the unique ID, and the public key of the public/private key pair to the identification provider.

6. The computer-implemented method of claim 1, wherein validating the identity of the user includes:
    soliciting, by the mobile device, from a data aggregator, validation of the identity of the user, based on the first image of the government issued document; and
    receiving the validation of the identity of the user, from the data aggregator, based on content received from at least one trusted source.

7. The computer-implemented method of claim 6, further comprising receiving consent from the user; and
    wherein soliciting the validation of the identity of the user from the data aggregator includes soliciting the validation of the identity of the user from the data aggregator only after receiving the consent from the user.

8. The computer-implemented method of claim 6, wherein the content from at least one trusted source includes social network data associated with the user.

9. The computer-implemented method of claim 1, wherein signing the hashed first image includes signing the hashed first image with the private key of the public/private key pair, only after the identity of the user is validated.

10. The computer-implemented method of claim 1, further comprising:
writing, by the identification provider, the signed hashed first image to a location in the ledger data structure, the location associated with a pointer;
correlating, by the identification provider, the signed hashed first image to the unique ID for the user, whereby the signed hashed first image is recallable based on the unique ID; and
transmitting, by the identification provider, the pointer to the mobile device.

11. The computer-implemented method of claim 1, further comprising:
receiving, by the mobile device, from the identification provider, at least one pointer to the ledger data structure, the at least one pointer unique to a location of the digital identity record; and
transmitting, by the application in the mobile device, the at least one pointer and the unique ID to a requestor, in response to a request to verify the identity of the user; and
wherein the at least one pointer includes a first pointer to the location of the digital identity record and a second pointer to a location of a certification of the digital identity record by the identification provider.

12. A system for verifying identities of users, the system comprising:
a mobile device specific to a user and configured, by an application and a software development kit (SDK) integrated into the application, to:
in response to a request for a unique identifier (ID) for the user, issue the unique ID for the user;
generate a public/private key pair specific to the unique ID, the public/private key pair including a public key and a private key;
prompt the user to capture a first image of a government issued document and a second image of a face of the user;
capture the first image of the government issued document, the government issued document including a biometric reference of the user and indicating an identity of the user, the first image including at least the biometric reference of the user from the government issued document;
capture the second image of the face of the user;
validate the identity of the user based on a comparison of the second image of the face of the user and the first image of the government issued document; and
based on the validation of the identity of the user:
convert the first image via a one-way hash function;
sign the hashed first image with the private key of the public/private key pair; and
transmit the signed hashed first image, the unique ID, and the public key of the public/private key pair to an identification provider, whereby a digital identity record including the signed hashed first image for the user is stored in a ledger data structure.

13. The system of claim 12, wherein the mobile device is configured, in order to validate the identity of the user, to:
solicit, from a data aggregator, validation of the identity of the user, based on the first image of the government issued document; and
receive the validation of the identity of the user, from the data aggregator, based on content received from at least one trusted source.

14. The system of claim 13, wherein the mobile device is configured to receive consent from the user;
wherein the mobile device is configured, in order to solicit the validation, to solicit the validation of the identity of the user from the data aggregator only after receiving the consent from the user; and
wherein the content from the at least one trusted source includes social network data associated with the user.

15. The system of claim 12, further comprising the identification provider, which is configured to:
write the signed hashed first image to a location in the ledger data structure, as part of the digital identity record, the location associated with a pointer;
correlate the signed hashed first image to the unique ID for the user, whereby the signed hashed first image is recallable based on the unique ID; and
transmit the pointer to the mobile device.

16. The system of claim 15, wherein the mobile device is configured to:
receive a request to verify the identity of the user from a requestor associated with a digital service; and
in response to the request from the requestor, provide the unique ID and the pointer to the requestor, whereby the requestor validates data against the digital identity record.

17. The system of claim 12, wherein the government issued document includes a government issued passport or an identification card.

18. A non-transitory computer-readable storage medium including executable instructions for use in verifying an identity of a user, the executable instructions defining an application and a software development kit (SDK) integrated therein, which, when executed by a processor, cause the processor to:
in response to a request for a unique identifier (ID) for the user, issue the unique ID for the user;
generate a public/private key pair specific to the unique ID, the public/private key pair including a public key and a private key;
prompt the user to capture a first image of a government issued document and a second image of a face of the user;
capture the first image of the government issued document, the government issued document including a biometric reference of the user and indicating an identity of the user, the first image including at least the biometric reference of the user from the government issued document;
capture the second image of the face of the user;
validate the identity of the user based on a comparison of the second image of the face of the user and the first image of the government issued document; and
based on the validation of the identity of the user:
convert the first image via a one-way hash function;
sign the hashed first image with the private key of the public/private key pair; and
transmit the signed hashed first image, the unique ID, and the public key of the public/private key pair to an identification provider, whereby a digital identity record including the signed hashed first image for the user is stored in a ledger data structure.

19. The non-transitory computer-readable storage medium of claim 18, wherein the executable instructions, when executed by the processor, further cause the processor to:
    receive and store a pointer for the digital identity record, the pointer indicative of a location of the digital identity record in the ledger data structure; and
    provide the pointer to a requestor, in response to a request to verify the identity of the user.

* * * * *